US009675916B2

(12) United States Patent
Clements et al.

(10) Patent No.: US 9,675,916 B2
(45) Date of Patent: Jun. 13, 2017

(54) SERVO-CONTROLLED BACKWASH FILTER SYSTEM

(71) Applicant: Eaton Corporation, Cleveland, OH (US)

(72) Inventors: Michael Roland Clements, White Pigeon, MI (US); John Henry Burczyk, Decatur, MI (US); Craig James Annable, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 321 days.

(21) Appl. No.: 13/645,046

(22) Filed: Oct. 4, 2012

(65) Prior Publication Data

US 2014/0097143 A1    Apr. 10, 2014

(51) Int. Cl.
*B01D 35/12*     (2006.01)
*B01D 29/66*     (2006.01)
*B01D 24/46*     (2006.01)
*B01D 29/00*     (2006.01)

(52) U.S. Cl.
CPC ........... *B01D 35/12* (2013.01); *B01D 29/668* (2013.01); *B01D 24/4636* (2013.01); *B01D 29/0081* (2013.01)

(58) Field of Classification Search
None
See application file for complete search history.

(56) References Cited

U.S. PATENT DOCUMENTS

| 3,157,131 A | 11/1964 | Brydon | |
|---|---|---|---|
| 3,954,621 A * | 5/1976 | Etani | B01D 23/00 210/167.14 |
| 4,119,540 A * | 10/1978 | Muller | B01D 29/117 210/142 |
| 4,714,552 A * | 12/1987 | Tabor | 210/329 |
| 4,906,373 A * | 3/1990 | Drori | B01D 25/26 210/331 |
| 4,976,873 A * | 12/1990 | Ross | 210/744 |
| 5,785,870 A | 7/1998 | Davis et al. | |
| 5,792,373 A | 8/1998 | Bennick et al. | |
| 2007/0215531 A1* | 9/2007 | Wawrla | C02F 1/003 210/101 |

FOREIGN PATENT DOCUMENTS

EP      0046919 A1     3/1982
KR    101054236 B1     8/2011

OTHER PUBLICATIONS

European Patent Office: International Search Reprot and Written Opinion in counterpart International Application No. PCT/US2013/062965. Date of Mailing: Dec. 20, 2013.
Chinese Office Action, Patent Application No. 2013800515406, dated Jan. 20, 2017.

* cited by examiner

*Primary Examiner* — Richard Gurtowski
(74) *Attorney, Agent, or Firm* — Fishman Stewart PLLC (57) ABSTRACT

A filtration unit contains a plurality of filter housings, each filter housing having a cylindrical shell with a lower port, an upper port, and a filter element. The lower and upper ports direct fluid through the filter housing in a first direction during a filtering cycle and direct fluid through the filter housing in a second direction during a backwashing cycle. The unit also includes a diverter and a servomechanism that rotates the diverter to selectively connect the filter housing to a drain port for the backwashing cycle.

20 Claims, 7 Drawing Sheets

| STEP | 1 | 2 | 3 | 4 | 5 | 6 | 7 | 8 | 9 | 10 | 11 | 12 | 13 | 14 | 15 | 16 | 17 | 18 | 19 | 20 | 21 | DESCRIPTION |
|---|---|---|---|---|---|---|---|---|---|---|---|---|---|---|---|---|---|---|---|---|---|---|
| APPROX TIME (Seconds) | - | 1 | 5 | 2 | 1 | 5 | 2 | 1 | 5 | 2 | 1 | 5 | 2 | 1 | 5 | 2 | 1 | 5 | 2 | 1 | 0 | |
| Drain Valve (N.C.) | | | ■ | | | ■ | | | ■ | | | ■ | | | ■ | | | ■ | | | | |
| Servo Motor | | ■ | | | ■ | | | ■ | | | ■ | | | ■ | | | ■ | | | ■ | | |
| Home Switch | ■ | | | | | | | | | | | | | | | | | | | | ■ | |

| Step | Description |
|---|---|
| 1 | Backwash Initiated |
| 2 | Rotate from "Home" to Station 1 |
| 3 | Backwash Station 1 |
| 4 | Station Pause, this allows the valves to close |
| 5 | Rotate Station 2 |
| 6 | Backwash Station 2 |
| 7 | Station Pause, this allows the valves to close |
| 8 | Rotate Station 3 |
| 9 | Backwash Station 3 |
| 10 | Station Pause, this allows the valves to close |
| 11 | Rotate Station 4 |
| 12 | Backwash Station 4 |
| 13 | Station Pause, this allows the valves to close |
| 14 | Rotate Station 5 |
| 15 | Backwash Station 5 |
| 16 | Station Pause, this allows the valves to close |
| 17 | Rotate Station 6 |
| 18 | Backwash Station 6 |
| 19 | Station Pause, this allows the valves to close |
| 20 | Rotate to "Home" |
| 21 | Backwash complete |

FIG. 7

SERVO-CONTROLLED BACKWASH FILTER SYSTEM

TECHNICAL FIELD

The present teachings relate to backwashable filtration systems for industrial process applications, and more particularly to backwashable filtration systems utilizing multiple filtration elements and a rotating member that isolates individual filter elements during a backwashing sequence.

BACKGROUND

Barrier filtration units are used in many industrial applications to selectively remove material from one or more fluid streams. Filter assemblies containing filtration media are used to both remove undesirable contaminates from the fluid and to extract desirable filtrates out of the fluid. Many filter assemblies include one or more filter units that are connected in parallel fashion to inlet and outlet headers through which the fluid stream is, respectively, applied to and removed from the filter units. Often these assemblies are further provided with some type of backwashing mechanism, which discharges accumulated solids from the filtration media by locally reversing flow through the filtration media.

Many filtration units have two or more filter housings to increase the filtering capacity of the system. The multiple filter housings may be arranged in a filter array connected to a common manifold with a diverter valve to control the fluid flow through each filter element. The diverter rotates or otherwise shifts position to close a selected filter housings from incoming liquid and open the filter unit to the drain circuit. As a result, the selected filter housing can undergo the backwashing cycle while the remaining filter housings continue to operate in the filtration cycle. As the diverter shifts position, individual filter housings can be cleaned without interrupting the overall filtering capacity of the filtration unit.

SUMMARY

The disclosure herein describes a filtration unit contains a plurality of filter housings, each filter housing comprising a cylindrical vessel having a lower port, an upper port, and a filter element. The lower and upper ports direct fluid through the filter housing in a first direction during a filtering cycle and direct fluid through the filter housing in a second direction during a backwashing cycle. The system also includes a diverter and a servomechanism that rotates the diverter to selectively connect the filter housing to a drain port for the backwashing cycle.

A method of cleaning the multi-housing filtration unit described above includes rotating the diverter via the servomechanism to selectively connect the filter housing to the drain port for the backwashing cycle, directing fluid in the second direction described above, expelling fluid through the drain port, and repeating the rotating, directing, and expelling steps for additional filter housings in the filtration unit.

DETAILED DESCRIPTION

For multi-unit backwash filtration units generally, each filter housing in the unit is often constructed to include an elongated shell through which fluid flows. One or more elongated filter elements, such as filter tubes, may be disposed in the shell. The top portions of the filter tubes may be fixed to a flange through which fluid can pass via openings in the flange. Each filter tube may have a sealed bottom and porous outer surfaces (which act as filtration media), which allow fluid to flow through while screening undesirable solid matter. During a filtration cycle, the fluid stream enters though a lower port in bottom of the housing and is forced upward. Since the bottom of the filter tube is sealed, the fluid stream is directed up and through the porous sides of the filter tube. Debris collects on the outer surfaces of the filter tube, and cleaned fluid flows through the media to the inside of the filter tube and is output through the flange and to an upper port in the housing. As debris continues to collect on the filter tube, the pressure differential across the filtration media may increase.

A backwash cycle may occur when a selected time period or pressure differential is reached. During the backwash operation, the fluid stream or a backwash fluid enters the upper port (which is normally the output of the housing), essentially reversing the direction of fluid flow through the filter housing. The pressure from the backwash fluid loosens the debris trapped on the outside of the filter tube. The debris is then purged downward and out the bottom port of the housing through a drain circuit. A flow diverter in a multi-housing filtration unit may be indexed to control, the timing of the backwashing cycle for a selected filter housing. However, there is a desire for a way to control the operation of the diverter to provide consistent backwash performance.

Figure 1:
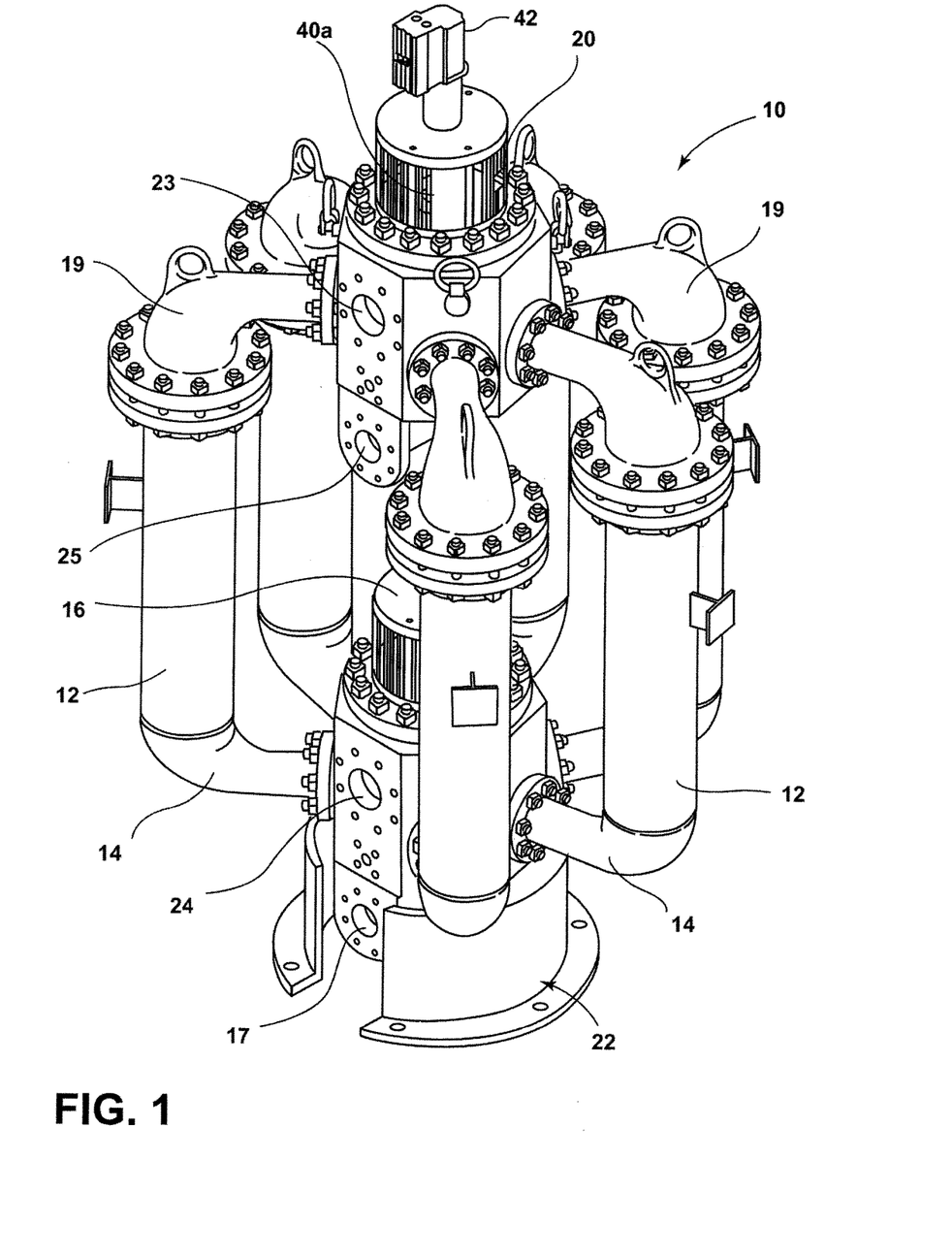
FIG. 1 is a perspective view of a multi-housing filtration unit according to one aspect of the present teachings.
Figure 2:
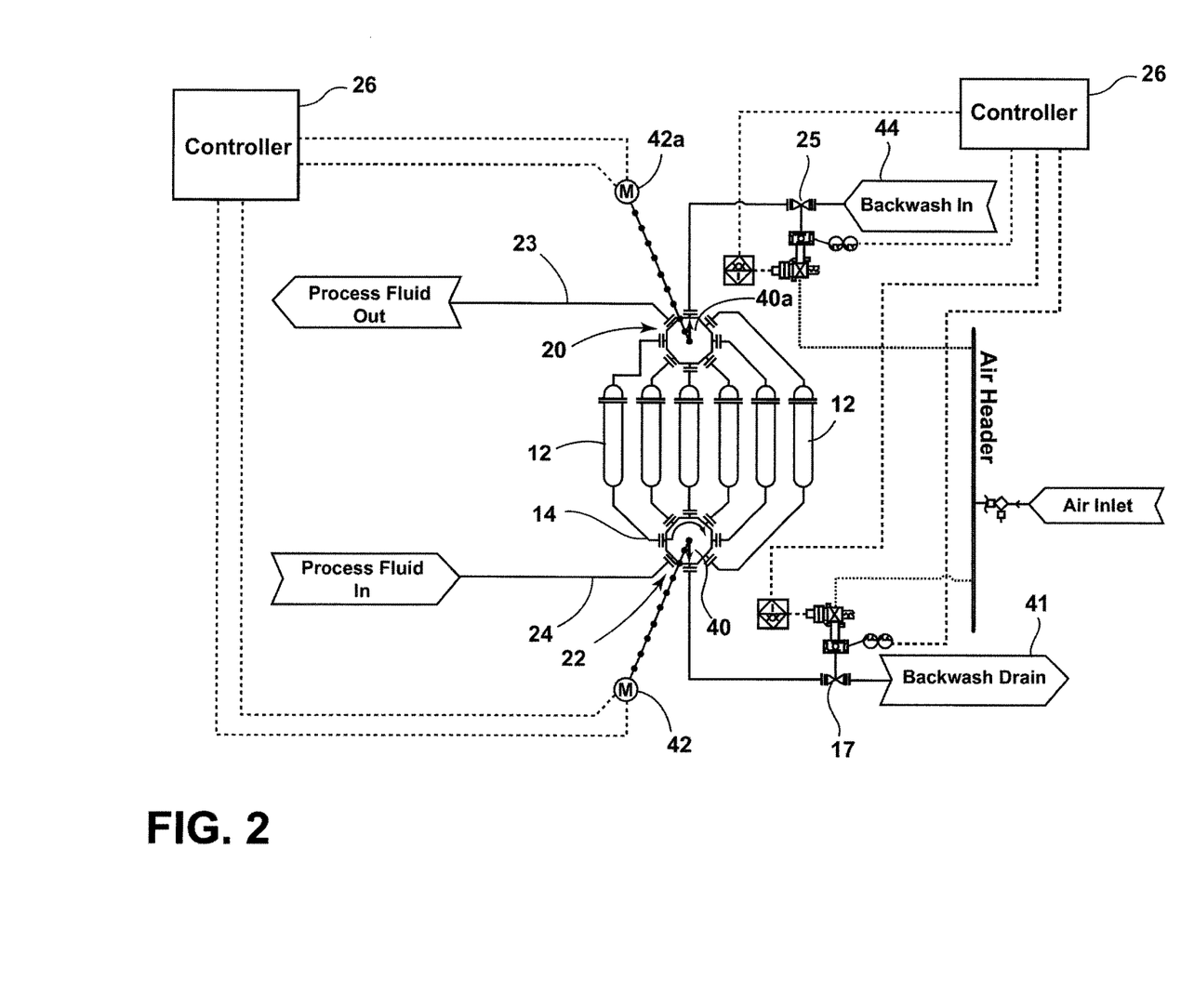
FIG. 2 is a schematic view of the multi-housing filtration unit of FIG. 1.
Figure 3:
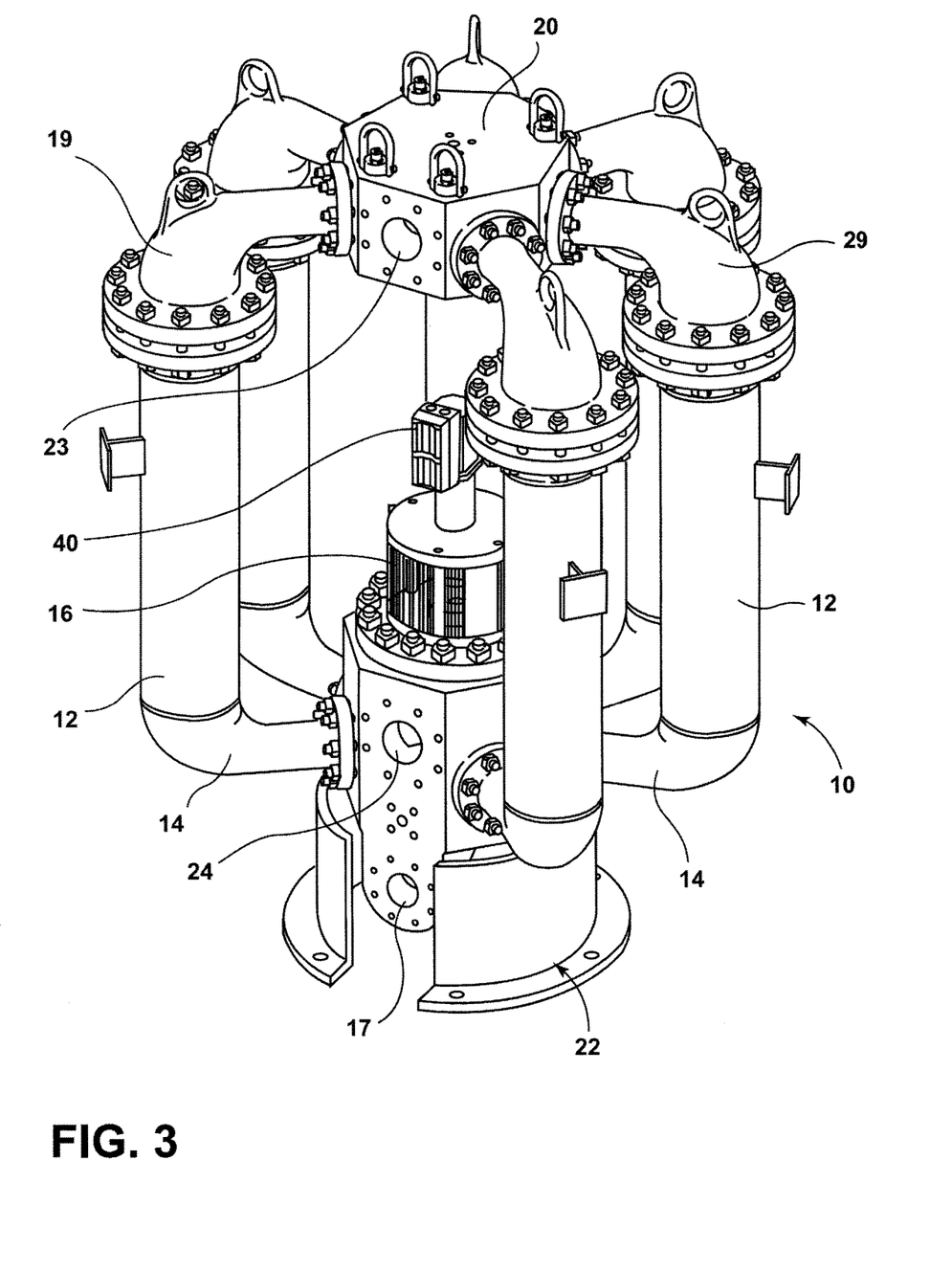
FIG. 3 is a perspective view of a multi-housing filtration unit according to another aspect of the present teachings.
Figure 4:
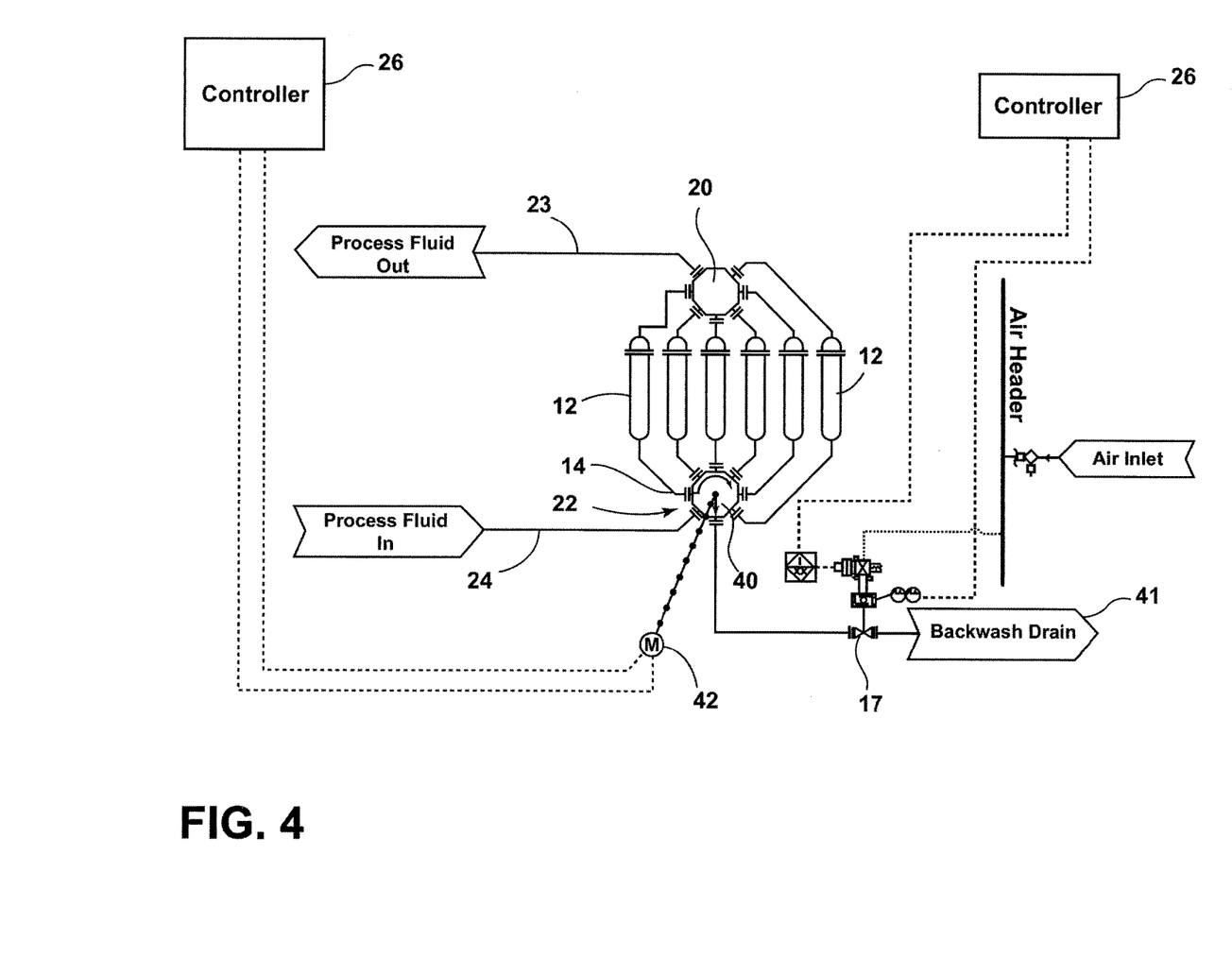
FIG. 4 is a schematic view of the alternative multi-housing filtration unit of FIG. 3.

The description below and the figures illustrate backwash filter systems designed to provide more dependable control over the backwashing process and more consistent backwash performance. FIGS. 1 and 2 illustrate an external backwash filtration unit 10, while FIGS. 3 and 4 illustrate an internal backwash filtration unit 10. Details of one type of filtration unit 10 adaptable to the present teachings is disclosed in commonly-assigned U.S. Pat. No. 5,792,373 the disclosure of which is incorporated by reference herein in its entirety. Note that the system shown in U.S. Pat. No. 5,792,373 includes individual valving in each housing, while the unit 10 according to one aspect of the present teachings has a shared flow diverter and drain valves, which will be described in greater detail below. In the present unit 10, the filter housings 12 may be arranged in any desired orientation. In the examples shown in FIGS. 1 and 2, the filter housings 12 are vertically oriented and arranged around a central hub 16. Those of ordinary skill in the art will understand that other filter housing 12 arrangements are possible without departing from the scope of the invention.

Figure 5A:
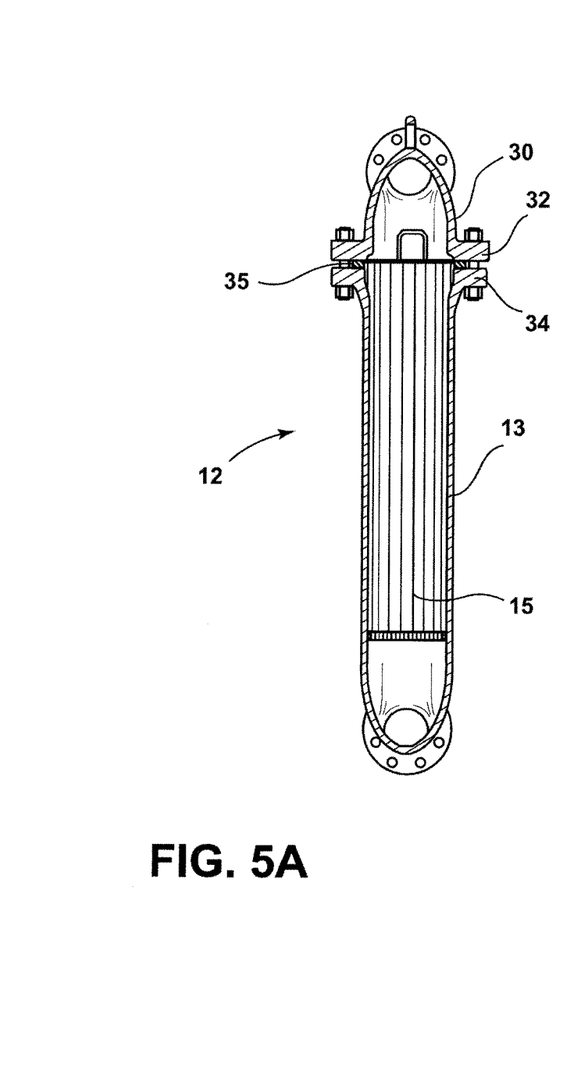
FIGS. 5A and 5B are side and section views, respectively, of a possible filter housing that can be used in the system of FIG. 1.
Figure 5B:
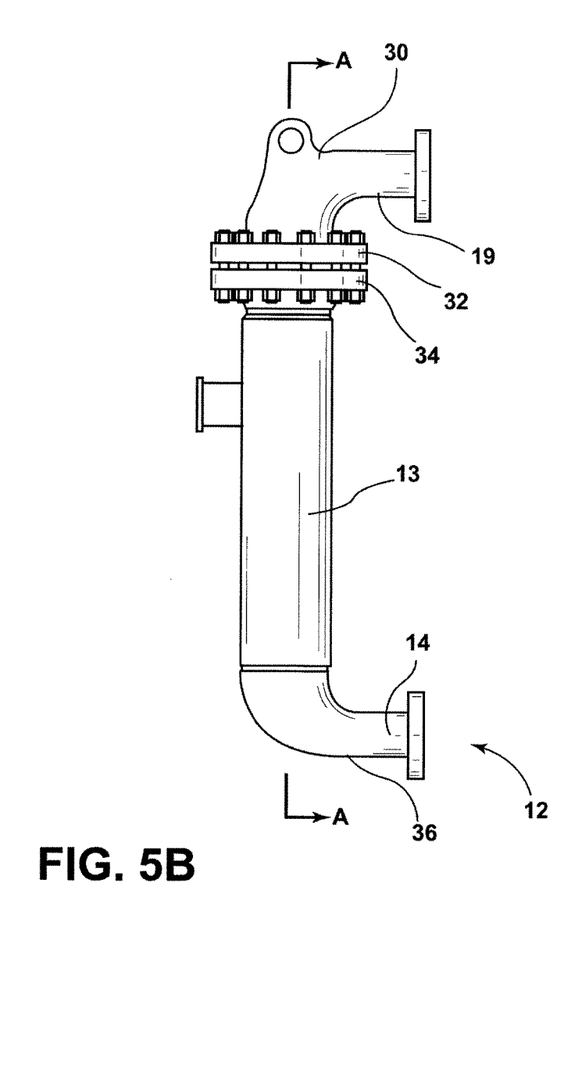

Referring to FIGS. 5A and 5B, each filter housing includes an elongated, generally cylindrical filter shell 13 that receives liquid through a lower port 14 to be filtered through a filter media element, such as filter element 15. The lower port 14 serves as an inlet port during a filtration cycle by receiving process fluid that is eventually filtered through the filter housing 12. The lower port also serves as an outlet port during a backwashing cycle by purging fluid and debris from the filter housing 12 toward a drain port 17, as shown in FIG. 1.

The shell 13 can also have an upper port 19. The upper port acts an outlet port during the filtration cycle by outputting cleaned process fluid after it has been filtered by the filter housing 12. The upper port 19 may also act as an inlet port during the backwashing cycle by receiving backwash fluid to loosen debris in the filter unit and force it downward to the lower port 14 so it can be flushed out of the filter housing 12. The lower and upper ports 14, 19 for each filter unit 12 may have an associated valve (not shown), such as a two-way valve, to control fluid flow into and out of the filter housing 12.

As shown in FIG. 1, the filter housings can be connected to an upper header 20 and a lower header 22. The upper header may have an upper process fluid port 23, and the lower header 22 may have a lower process fluid port 24. FIG. 1 illustrates an external backwash filtration unit 10, so the upper header 20 can also include a backwash fluid inlet port 25, which is connectable to an external backwash fluid source, and the lower header 22 can include the drain port 17. In an internal backwash system, such as the system shown in FIGS. 3 and 4, the backwash fluid inlet port 25 can be omitted. In one aspect of the teachings, the process fluid ports 23, 24, the backwash fluid inlet port 25, and the drain port 17 are opened and closed by electrically-controlled valves. In one aspect of the teachings valves may be normally-closed valves that open when energized by a controller 26 via any known method.

FIGS. 5A and 5B illustrate one possible structure for the filter housing 12 in more detail. FIG. 5B is an outside view of the filter housing 12, while FIG. 5A is a section view taken along line A-A of FIG. 5B. Note that generally, the filter housing 12 includes two nested tubes: the shell 13 and the filter element 15. The specific configuration of the shell 13 and the filter element 15 themselves is not critical to the teachings; the unit 10 can use any filter housing 12 configuration without departing from the scope of the teachings. The description below outlines one possible type of filter housing 12 configuration, which is described in greater detail in commonly-assigned U.S. Pat. No. 5,785,870, the disclosure of which is incorporated herein by reference in its entirety.

In one aspect of the teachings, the filter element 15 can be a cylinder of porous material, such as slotted wedge-wire, perforated metal, wire cloth mesh, sintered metal, porous ceramic, or other porous materials appropriate for industrial filtration. In another aspect of the teachings, the filter element 15 includes a plurality of elongated cylindrical filter rods that filter the fluid stream. The filter rods can be arranged in a circular arrangement to form a roughly cylindrical frame. A thin metal wrap may be wound in a close fitting helical pattern around the filter rods. This thin helical wrap defines interstitial spaces between the individual turns thereof that function as the pores of the filter rod through which the process stream flows. Thus, the wrap acts as the filter media of the filter element 15. Those of skill in the art will understand the filter element 15 in the filter housing 12 can have other configurations without departing from the scope of the invention.

The filter housing 12 may have a cover 30 with a flange 32 that attaches to a corresponding flange 34 on the shell 13 via a bolted connection, a threaded connection, or other connection. The cover 30 may provide the structure forming the upper port 19. The flange 32 isolates the lower port 14 from the upper port 19 and forces fluid to flow through the filter housing 12 and filter element 15. Seals (not shown) may be disposed between the flanges 32, 34 to prevent fluid bypass flow out of the unit 12. Alternatively or in addition, the filter element 15 may have a sealing flange 35 that provides the seal between the flanges 32, 34. An end cap 36 may be attached to the bottom of the shell 13 and form the lower port 14. The construction and operation of the overall filtration unit 10 will now be explained in greater detail. A given filtration unit 10 can have any number of filter housings 12 connected together to a central hub having a diverter 40, which selectively connects the filter housings 12 to the drain port 17. As explained above, process fluid or backwash fluid is directed through the ports 14, 17, 19 in different directions for a given filter unit 12 depending on the current operation (i.e., normal or backwash) of that particular unit 12. The backwash process can be sequenced through the filter housings 12 via the diverter so that backwashing can occur for a given filter housing 12 without interrupting the filtration operations of the other filter housings 12. In other words, as the selected filter housing 23 undergoes the backwash cycle, the other filter housings 12 continue to operate in the filtration cycle without interruption.

In the external backwash system example shown in FIGS. 1 and 2, the system may include two backwash diverters 40, 40a, with one diverter 40a located in the upper header and the other diverter 40 located in the lower header 22. Both diverters 40, 40a are rotated in a coordinated, controlled manner by a servomechanism 42 so that they are aligned with a given filter housing 12 to be backwashed. The lower diverter 40 creates a flow path between the filter housing 12, the upper port 19, and the backwash fluid inlet port 25. Note that backwashing flow will not occur until a backwash drain valve (not shown) is opened and flow can travel from a high fluid pressure region, such as an external backwash fluid source 44, to a lower pressure region, such as a drain sump 41.

In the internal backwash example shown in FIGS. 3 and 4, the system only needs one backwash diverter 40 located in the lower header 22. When the diverter 40 rotates to a given filter housing 12 to be backwashed, a flow path is created between the lower port 14 and the drain port 17. No backwashing flow occurs until the backwash drain valve (not shown) is opened. When the backwash drain is opened, the pressure differential between fluid in the upper header 20 and fluid in the drain sump 41 will drive clean fluid issuing from the other filter housings 12 to flow through the filter element 15 being washed and out the drain sump 41.

In other words, in one aspect of the teachings, the diverter prevents process fluid from entering the selected filter housing 12 during backwashing by, for example closing the lower port 14 from a process fluid source. As noted above, backwashing fluid entering from the upper port 19 forces backwash fluid to flow in reverse through the filter housing 12, loosening debris and forcing it downward. In one aspect of the teachings, the backwash fluid is pressurized so that when it flows into the filter housing 12, it jars the debris loose from the filter tube 15. The diverter may also open the selected filter housing 12 to the drain sump 41 to allow the loosened debris to be expelled from the filter housing 12. For external backwash applications, where the backwash fluid comes from the external source 44, a separate diverter 40a, which may also be controlled by its own associated servomechanism 42a, may be disposed at the top of the filter housings 12 to control the output of process fluid and/or the input of backwash fluid. For internal backwash applications, where process fluid is also used as backwash fluid, the separate diverter 40a can be omitted.

Once the backwashing sequence for the selected filter housing 12 is complete, the diverter 40 shifts position, allowing the selected filter housing 12 (now cleaned) to reconnect with the process fluid source and resume filtration of the process fluid within that unit. Depending on the specific timing of the backwashing sequence, the diverter 40 may rotate so that it is not aligned with any housing 12 to make all of the housings 12 available for filtering. When another filter housing 12 is to be backwashed, the diverter 40 rotates to close the lower port 14 of another filter housing 12 from the process fluid source to initiate the backwashing cycle in that filter housing 12 as described above. The elapsed time between consecutive backwashing cycles depends on the parameters the servomechanism 42 uses to control the diverter 40, which can be selected by the user based on the desired operation of the unit 10.

In one aspect of the teachings, the servomechanism 42 controls operation of the diverter 40 by shifting the position of the diverter 40 after an elapsed time (e.g., several seconds) to initiate the backwashing cycle of a new filter housing 12. Alternatively, the servomechanism 42 may shift position based on a detected pressure differential across the filtration media, such as the filter element 15, to provide closed-loop feedback control. For example, the servomechanism 42 may be designed to operate the diverter 40 based on torque, temperature, and/or data indicating the rotational or angular position of a shaft supporting the diverter 40. Those of ordinary skill in the art will understand that appropriate sensors and signals can be used to provide the data to control the diverter 40 via closed-loop feedback. For example, the position of the diverter 40 can be monitored by a proximity switch or a rotary encoder, and the torque and temperature can be monitored by sensors in the servomechanism 42.

By controlling the diverter 40 based on feedback from the system 10, the servomechanism 42 can provide consistent backwash performance as well as provide useful data for preventive maintenance and troubleshooting. Note that using the servomechanism 42 to control the diverter 40 provides greater options than previously known systems. For example, the diverter 40 can be controlled to backwash filter units out of sequence, vary the length of each backwash cycle (e.g., customize the cycle based on the amount of cleaning each filter housing 12 requires), and/or incorporate other strategies to maximize efficiency of the backwash operation.

Figure 6:
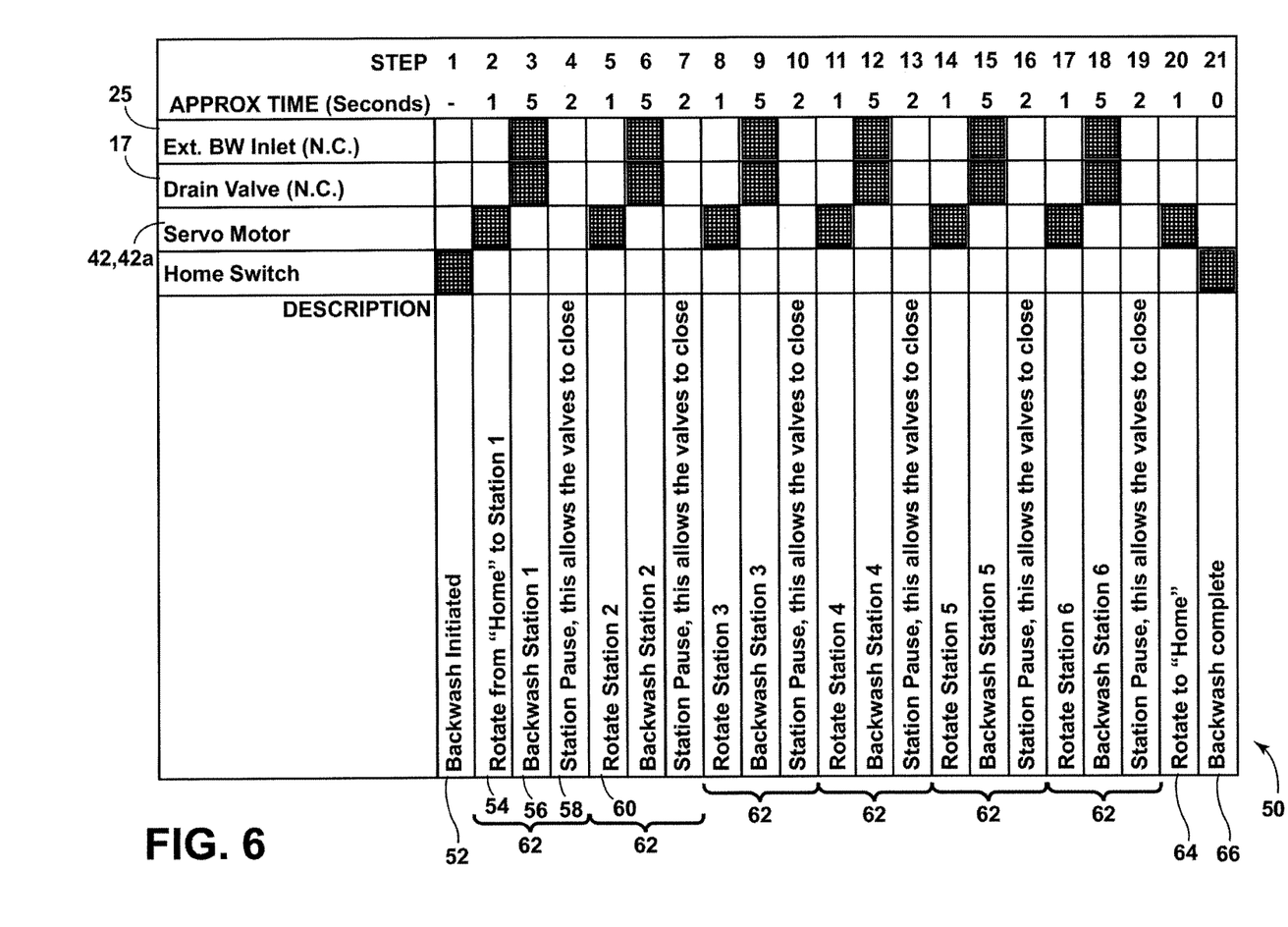
FIG. 6 is a chart illustrating a backwashing process conducted by the filtration unit of FIGS. 1 and 2 according to one aspect of the teachings.
Figure 7:
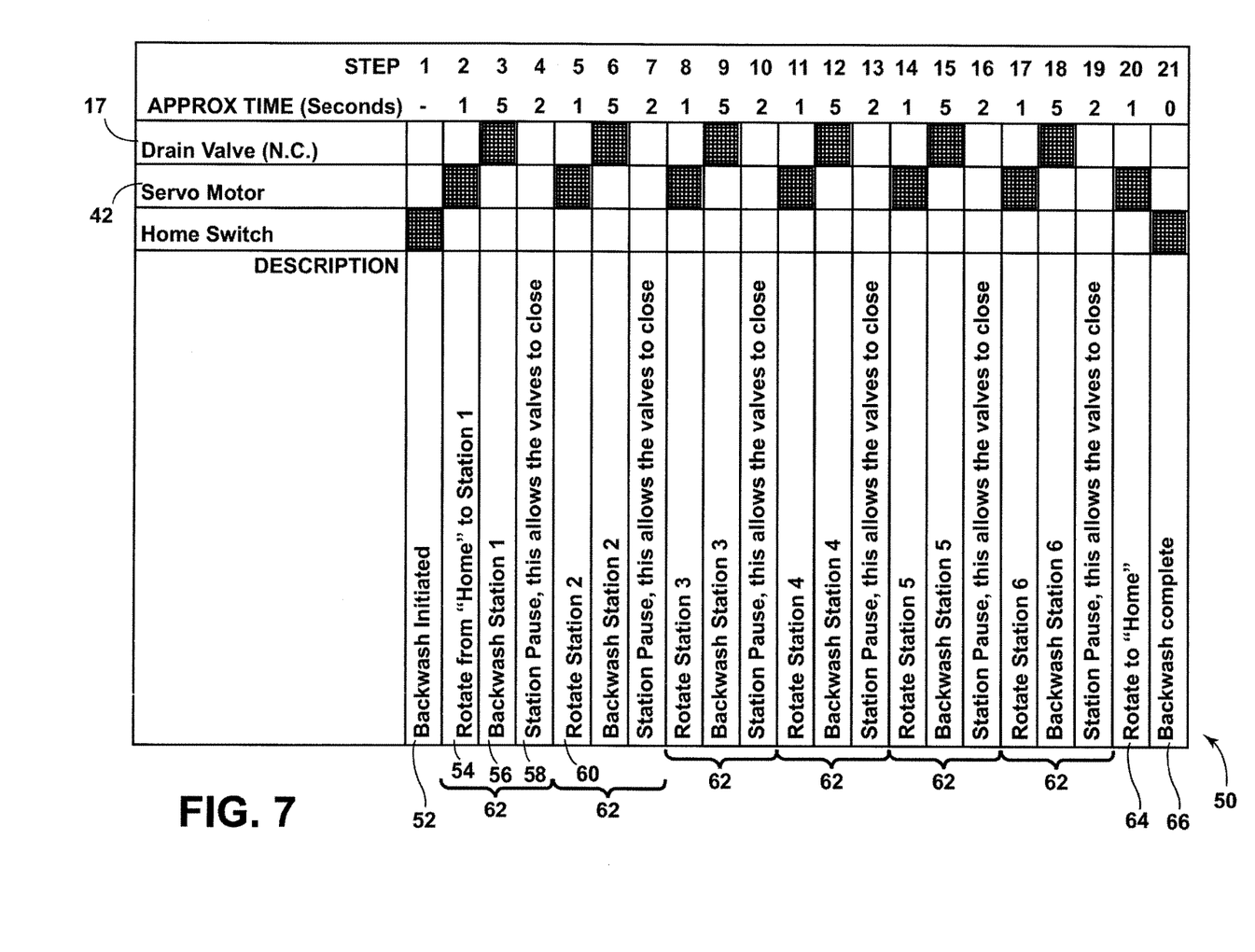
FIG. 7 is a chart illustrating a backwashing process conducted by the filtration unit of FIGS. 3 and 4 according to one aspect of the teachings.

FIG. 6 is a chart illustrating a backwash cycle 50 for a six-station external backwash filtration unit 10, such as the unit shown in FIGS. 1 and 2, according to one aspect of the teachings. Note that the chart in FIG. 6 assumes that the unit 10 is an external backwash unit 10 with the backwash inlet port 25 opened and closed by a normally-closed valve. FIG. 7 is a similar chart illustrating a backwash cycle 50 for an internal backwash filtration unit 10, such as the unit shown in FIGS. 3 and 4, which does not have a separate backwash inlet port. Even though the structures of the external backwash unit and the internal backwash unit are slightly different, the operations of the drain valve 16, the servomechanism 42 and the diverter 40 are generally the same for both systems 10.

As explained above, the backwash cycle 50 for a given filtration unit 10 may be initiated 52 after, for example, a given time period has elapsed or based on a monitored characteristic (pressure, temperature, torque, etc.). When the cycle is initiated 52, the servomechanism 42 rotates the diverter 40 to isolate the selected filter housing 12 to be backwashed 54. Next, if the unit 10 is an external backwashing filtration unit, the separate servomechanism 42a moves the separate diverter 40a until the diverter 40a connects the filter housing 12 to the backwash fluid source 44 at step 54 as well. Next, when the drain valve is opened, the process fluid (in an internal backwashing system) or backwash fluid (in an external backwashing system) is forced through the selected filter housing 12 in a reverse direction to carry out the backwashing process 56. This reverse fluid flow generates pressure within the filter housing 12, loosening the debris on the outside of the filter tube 15 to force it downward in the filter housing 12 and out the drain 41. Once the selected filter housing 12 is cleaned, the servomechanism 42 (and the separate servomechanism 42a, if using) checks the elapsed time and/or operating conditions and also pauses to allow time for the valves associated with the backwashing inlet port 25 (if using) and the drain port 17 to close 58. If the desired time and/or operating conditions are met, the servomechanism 42 rotates the diverter 40 (and separate diverter 40a, if using) until it connects another filter housing 12 to be backwashed to the drain 41 at step 60 to start a new cycle. As noted above, the servomechanism 42 can control rotation of the diverter 40, and therefore operation of the backwash cycle, based on any desired filtration unit 10 parameters. The rotate 54/backwash 56/pause 58 steps together form a complete backwash cycle 62 for a given filter housing 12, and this cycle 62 may be repeated for each filter housing 12 in the unit 10 as shown in FIG. 5. Once all of the filter housing 12 have been cleaned, the servomechanism 42 rotates the diverter 40 back to the home position (step 64) and the home switches are activated 66 to indicate completion of the backwashing process.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A filtration unit, comprising:
a plurality of filter housings vertically oriented around a central hub, each filter housing having:
a cylindrical shell having a lower port and an upper port, and
a filter element, wherein the lower and upper ports direct fluid through the filter housing in a first direction during a filtering cycle and direct fluid through the filter housing in a second direction during a backwashing cycle;
the central hub having:
a servomechanism;
a first diverter, disposed inside a lower header and being rotatable about the central hub such that the first diverter shifts between a position where none of the plurality of filter housings are coupled to a drain port and one of a plurality of other positions where at least one of the plurality of filter housings is coupled to the drain port; and
a second diverter, disposed inside an upper header and being rotatable about the central hub such that the second diverter shifts between a position where none of the plurality of filter housings are coupled to a drain port and one of a plurality of other positions where at least one of the plurality of filter housings is coupled to the drain port; and
the servomechanism being operatively coupled to the first diverter and the second diverter, wherein the servomechanism rotates, in a coordinated manner, the first and second diverters about the central hub to couple at least one of the plurality of filter housings to the drain port for the backwashing cycle;
wherein, the first diverter includes a first fluid conduit and the second diverter includes a second fluid conduit; and the lower header and the upper header are centrally positioned between the plurality of filter housings.

2. The filtration unit of claim 1, wherein the first direction is from the lower port to the upper port and the second direction is from the upper port to the lower port.

3. The filtration unit of claim 1, further comprising:
the upper header having a process fluid outlet port; and
the lower header having the drain port.

4. The filtration unit of claim 3, wherein the lower header further includes a process fluid inlet port, and wherein the process fluid inlet port and the drain port each form an independent fluid flow circuit.

5. The filtration unit of claim 3, wherein the upper header further comprises a backwash fluid inlet port that can be coupled to a backwash fluid source.

6. The filtration unit of claim 5, further comprising:
a second servomechanism that controls the second diverter, wherein the second servomechanism rotates the second diverter about the central hub to selectively couple the upper port of at least one of the plurality of filter housings to the backwash fluid source for the backwashing cycle.

7. The filtration unit of claim 1, wherein the servomechanism rotates the diverter based on at least one of an elapsed time and an operating characteristic of the filtration unit.

8. The filtration unit of claim 7, wherein the operating characteristic is at least one selected from the group consisting of pressure, temperature, torque, and diverter position.

9. The filtration unit of claim 7, wherein the operating characteristic is a differential pressure across the filter element.

10. A method of cleaning a filtration unit having a plurality of filter housings, each filter housing including:
a cylindrical shell having:
a lower port,
an upper port, and
a filter element, wherein the lower and upper ports direct fluid through the filter housing in a first direction during a filtering cycle and direct fluid through the filter housing in a second direction during a backwashing cycle;
a central hub having:
a servomechanism,
a first diverter, and
a second diverter, the first diverter being disposed within a lower header,
wherein the first diverter and the second diverter are movable about the central hub such that the first diverter and the second diverter shift between a position where none of the plurality of filter housings are coupled to a drain port and one of a plurality of other positions where at least one of the plurality of filter housings is coupled to the drain port; wherein the servomechanism is operatively coupled to the first and second diverters, and wherein the first diverter includes a first fluid conduit and the second diverter includes a second fluid conduit, the method comprising:
isolating a filter housing by rotating the first diverter and the second diverter about the central hub via the servomechanism to selectively couple at least one of the plurality of filter housings to the drain port for the backwashing cycle;
simultaneously directing fluid in the first direction and the second direction;
expelling fluid directed in the second direction through the drain port; and
repeating the rotating, directing, and expelling steps for another one of said at least one of the plurality of filter housings;
wherein the lower header and the upper header are centrally positioned between the plurality of filter housings.

11. The method of claim 10, further comprising evaluating an operating characteristic, wherein the rotating step is conducted based on the operating characteristic.

12. The method of claim 11, wherein the operating characteristic is at least one selected from the group consisting of pressure, temperature, torque, and diverter position.

13. The method of claim 11, wherein the operating characteristic is a differential pressure across the filter element.

14. The method of claim 10, wherein the rotating step is conducted based on an elapsed time.

15. A filtration unit, comprising:
a plurality of filter housings, each filter housing having:
a cylindrical shell having a lower port and an upper port, and
a filter element, wherein the lower and upper ports direct fluid through the filter housing in a first direction during a filtering cycle and direct fluid through the filter housing in a second direction during a backwashing cycle;
an upper header having a process fluid outlet port and a backwash fluid inlet port;
a lower header having a drain port and a process fluid inlet port;
a central hub having:
a servomechanism,
a first diverter, and a second diverter, the first diverter being disposed and supported for movement within the lower header and the second diverter being disposed and supported for movement within the upper header, wherein the first diverter is movable about the central hub such that the first diverter shifts between a position where none of the plurality of filter housings are coupled to the drain port and one of a plurality of other positions where the lower port is coupled to the drain port; and wherein the second diverter is movable about the central hub such that the second diverter shifts between a position where none of the plurality of filter housings are coupled to the backwash fluid inlet port and one of a plurality of other positions where the upper port is coupled to the backwash fluid inlet port, the servomechanism being operatively coupled to the first diverter and the second diverter, wherein the servomechanism rotates, in a coordinated manner, the first diverter and the second diverter about the central hub based on at least one of an elapsed time and an operating characteristic of the filtration unit; and the lower header and the upper header are centrally positioned between the plurality of filter housings.

16. The filtration unit of claim 15, wherein the process fluid inlet port and the process fluid outlet port form an independent fluid flow circuit.

17. The filtration unit of claim 16, wherein the backwash fluid inlet port can be coupled to a backwash fluid source.

18. The filtration unit of claim 17, further comprising:

a second servomechanism that controls the second diverter, wherein the servomechanism rotates the second diverter about the central hub based on at least one of an elapsed time and an operating characteristic of the filtration unit.

19. The filtration unit of claim 15, wherein the operating characteristic is at least one selected from the group consisting of pressure, temperature, torque, and diverter position.

20. The filtration unit of claim 15, wherein the operating characteristic is a differential pressure across the filter element.

* * * * *